(12) United States Patent
Stultz

(10) Patent No.: US 11,932,047 B2
(45) Date of Patent: Mar. 19, 2024

(54) WRITING UTENSIL WITH SCALE HAVING A REFERENCE GUIDE

(71) Applicant: CH HANSON CO, Naperville, IL (US)

(72) Inventor: Ben Stultz, West Chicago, IL (US)

(*) Notice: Subject to any disclaimer, the term of this patent is extended or adjusted under 35 U.S.C. 154(b) by 290 days.

(21) Appl. No.: 17/095,713

(22) Filed: Nov. 11, 2020

(65) Prior Publication Data

US 2021/0276361 A1 Sep. 9, 2021

Related U.S. Application Data

(60) Provisional application No. 62/933,975, filed on Nov. 11, 2019.

(51) Int. Cl.
*B43K 29/08* (2006.01)
*B43K 19/14* (2006.01)
*G01B 3/04* (2006.01)

(52) U.S. Cl.
CPC .............. *B43K 29/08* (2013.01); *B43K 19/14* (2013.01); *G01B 3/04* (2013.01)

(58) Field of Classification Search
USPC .......................................................... 33/485
See application file for complete search history.

(56) References Cited

U.S. PATENT DOCUMENTS

| | | |
|---|---|---|
| 60,315 A | 12/1866 | Worcester |
| 206,410 A | 7/1878 | Adler |
| 575,671 A | 1/1897 | Watts et al. |
| 942,771 A * | 12/1909 | Breining .................. G01B 3/04 7/164 |
| 1,505,264 A | 8/1924 | Hilmerson |
| 1,607,097 A | 11/1926 | Murphy |
| 1,806,849 A | 5/1931 | Gelardi |
| 2,251,640 A | 8/1941 | Skrainka |
| 2,388,252 A * | 11/1945 | Crane .................... B43K 29/08 401/6 |
| 2,518,128 A * | 8/1950 | Dufilho .................. B43K 29/08 33/809 |
| 3,568,923 A * | 3/1971 | Chapman ................. G06G 1/04 235/79.5 |
| 3,764,064 A | 10/1973 | Gaidos et al. |

(Continued)

FOREIGN PATENT DOCUMENTS

| | | |
|---|---|---|
| CA | 2764616 | 7/2013 |
| CN | 87209882 | 6/1988 |

(Continued)

OTHER PUBLICATIONS

US 8,801,309 B2, 08/2014, Ryan (withdrawn)

*Primary Examiner* — George B Bennett
(74) *Attorney, Agent, or Firm* — GottardoLaw LLC; David A. Gottardo, Esq.

(57) ABSTRACT

A marking utensil comprises an elongated body having opposite ends, with the body defining a plurality of outwardly-directed surfaces between the ends. A scale is displayed on at least one surface of the plurality, with at least one surface of the plurality configured for placement along an exteriority of the article to facilitate a measurement thereof. The scale may display U.S. Customary (i.e., inches) and/or Metric International System (i.e., centimeters) Units of measure. A marking tip is located at one end of the body while a reference guide is located at the body's other end.

6 Claims, 6 Drawing Sheets

(56) References Cited

U.S. PATENT DOCUMENTS

| | | |
|---|---|---|
| D258,911 S | 4/1981 | Sandel |
| D264,824 S | 6/1982 | Sandel |
| 4,403,418 A | 9/1983 | Vagias |
| D272,421 S | 1/1984 | Sandel |
| D286,646 S | 11/1986 | Mori |
| 4,815,881 A | 3/1989 | Chern |
| D301,043 S | 5/1989 | Castle |
| D375,759 S | 11/1996 | Piscatelli |
| D422,309 S | 4/2000 | Bond |
| D492,346 S | 6/2004 | Huang |
| D539,682 S | 4/2007 | Huang |
| D564,585 S | 3/2008 | Wertime |
| D624,123 S | 9/2010 | Huang |
| D660,910 S | 5/2012 | Carpenter |
| 8,864,397 B2 * | 10/2014 | Ryan ................ G01C 9/26 401/52 |

FOREIGN PATENT DOCUMENTS

| | | |
|---|---|---|
| CN | 2758114 | 10/2003 |
| CN | 201456730 | 5/2010 |
| CN | 201597317 | 10/2010 |
| CN | 201833689 | 5/2011 |
| CN | 201931827 | 8/2011 |
| CN | 102358092 | 2/2012 |
| CN | 202242544 | 5/2012 |
| CN | 202727721 | 2/2013 |
| CN | 103802546 | 5/2014 |
| CN | 103895399 | 7/2014 |
| CN | 104309363 | 1/2015 |
| CN | 204149715 | 2/2015 |
| CN | 204605286 | 9/2015 |
| CN | 105500965 | 4/2016 |
| CN | 105783621 | 7/2016 |
| CN | 205523224 | 8/2016 |

* cited by examiner

WRITING UTENSIL WITH SCALE HAVING A REFERENCE GUIDE

CROSS REFERENCE TO RELATED APPLICATIONS

This application claims priority to U.S. Provisional Patent Application Ser. No. 62/933,975, filed on Nov. 11, 2019.

TECHNICAL FIELD OF THE INVENTION

This invention relates generally to writing utensils bearing a scale for measuring articles. More specifically, the invention relates to writing utensils bearing a scale and having a reference guide for readily aligning the scale in relation to the article.

BACKGROUND OF THE INVENTION

Within the construction and carpentry trades, the ready measurement and marking of articles, such as pieces of lumber or other construction materials, regularly occurs. Thus tradesman often carry and utilize a variety of measuring and marking instruments, to include various rulers, measuring tapes, carpenter's pencils and crayons, as well as markers. However, having to carry and utilize this variety of instruments proves cumbersome within a hectic construction or carpentry environment where a great many tools are utilized.

Also, traditional measuring instruments, such as yardsticks and twelve inch rulers, tend to be both inefficient and oversized, thus making them ill-suited for taking quick measurements of smaller articles or within confined spaces. The inefficiency of these instruments is exemplified by their lack of a reference guide that enables a user to readily align them with an article's edge for the ready determination of a measurement therefrom. The lack of this reference guide thus requires a user of traditional marking instruments to manually align a marking or end of a given instrument with the edge of the article; thus requiring a more careful use of the instrument. While, traditional T-squares and similar instruments having a reference guide are present within the prior art, their larger size again makes them ill-suited for measuring smaller articles and obtaining measurements within confined spaces.

Furthermore, the flat configuration of traditional measuring instruments at times makes their use difficult where a user is required to view the instruments from a location about directly above the instrument's face. However, having to view the instrument from this vantage point is often not possible when measuring in confined areas. Moreover, all of these aforementioned instruments lack having a writing instrument incorporated therein, thus requiring one to carry separated measuring and marking instruments.

Thus, what is needed is a combination measuring and marking instrument that obviates the foregoing disadvantages. The present invention does this and provides other advantages over the prior art as well.

SUMMARY OF THE INVENTION

This invention relates generally to writing utensils bearing a scale for measuring articles. More specifically, the invention relates to writing utensils bearing a scale and having a reference guide for readily aligning the scale in relation to the article. The marking utensil comprises an elongated body having opposite ends, with the body defining a plurality of outwardly-directed surfaces between the ends. A scale is displayed on at least one surface of the plurality, with at least one surface of the plurality configured for placement along an exteriority of the article to facilitate a measurement thereof. The scale may display U.S. Customary (i.e., inches) and/or Metric International System (i.e., centimeters) Units of measure. A marking tip is located at one end of the body while the reference guide is located at the body's other end.

The guide comprises an abutment surface configured for placement along an edge of the article and is preferably about perpendicular to at least the surface of the plurality configured for placement along the article's exteriority. The abutment surface preferably defines a planar face configured for placement against the edge of the article. To facilitate fast and efficient measurement, the reference guide extends outwardly of at least the surface configured for placement against the article's exteriority such that the abutment surface abuts the article's edge when one of the surfaces of the utensil's body is placed against the article's exteriority.

DESCRIPTION OF THE EMBODIMENTS

Figure 1:
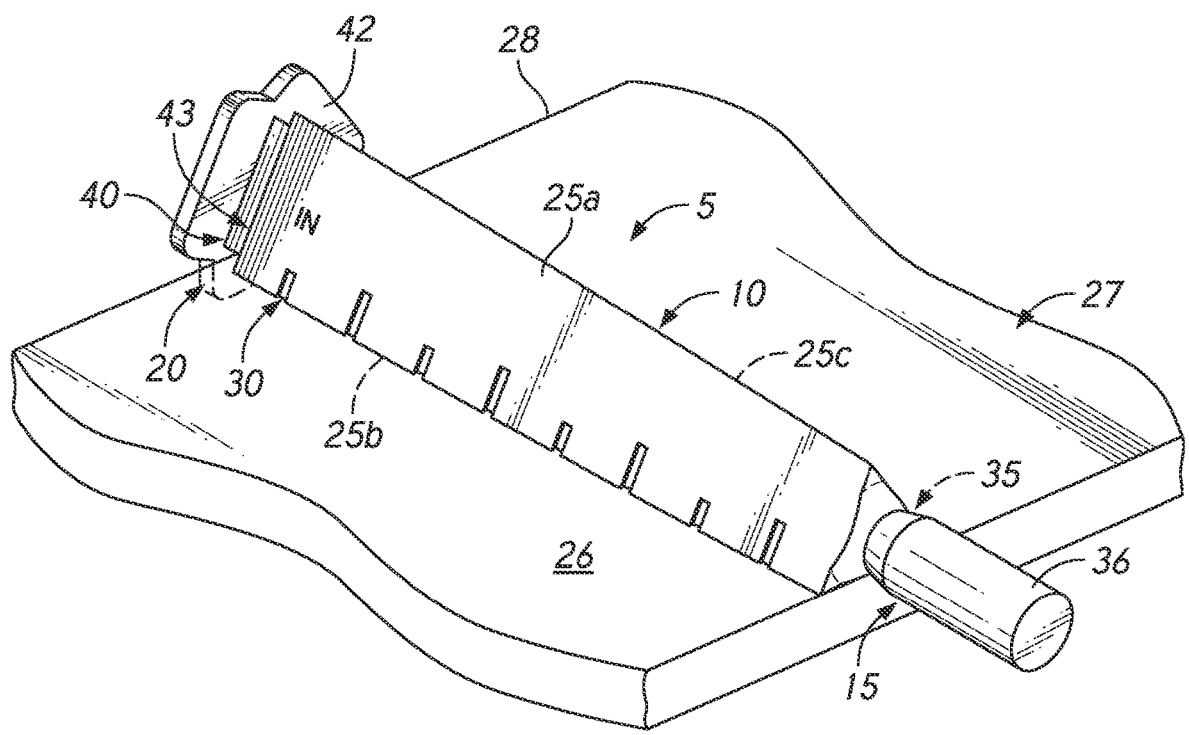
FIG. 1 is a perspective view of a first embodiment of the writing utensil having a body defining the cross section of a triangle and showing a surface having a scale in graduated inches.
Figure 2:
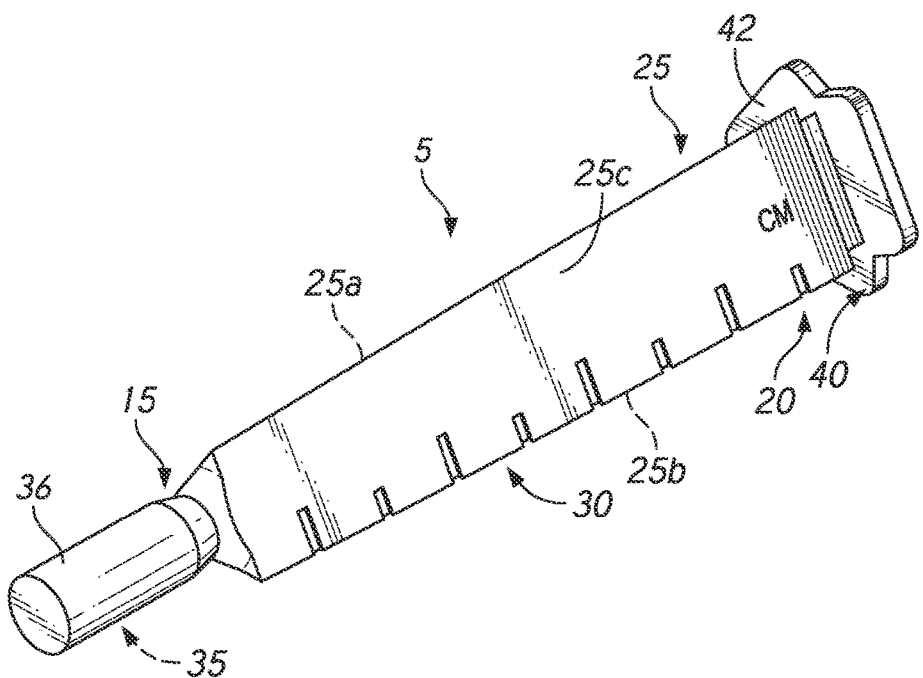
FIG. 2 is a perspective view of the embodiment of FIG. 1 showing an opposite surface having a scale in graduated centimeters.
Figure 3:
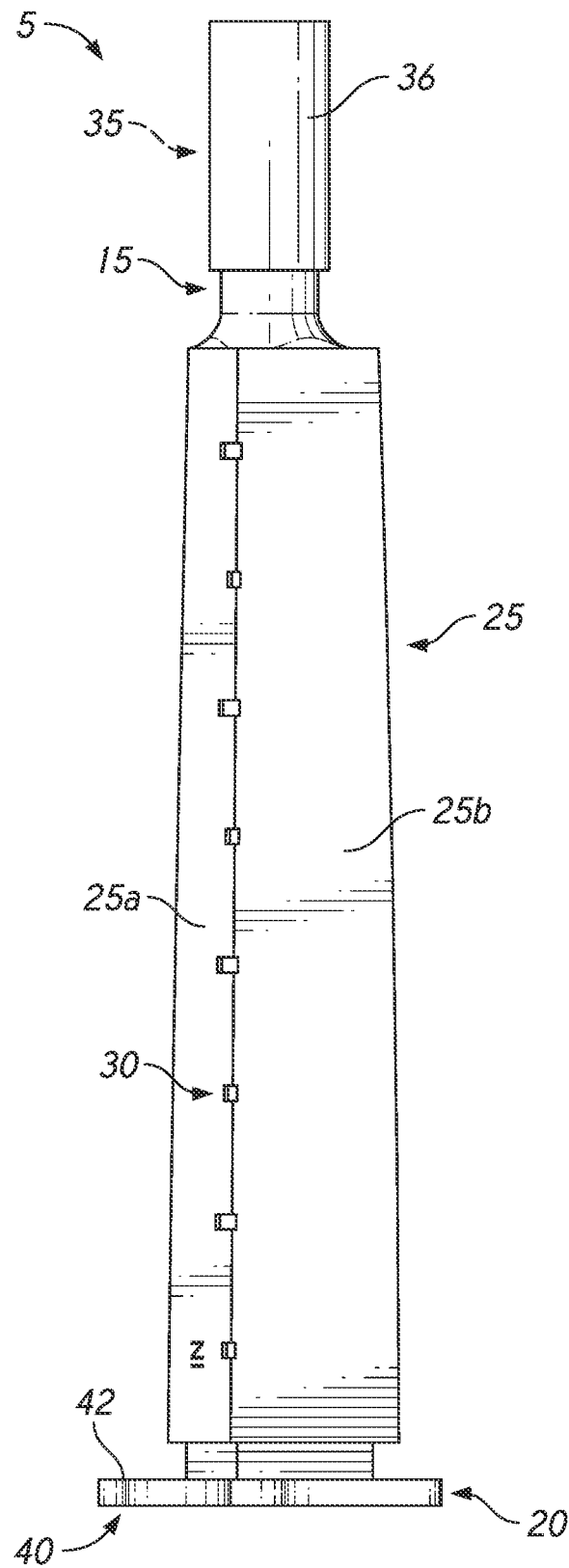
FIG. 3 is an elevation of the embodiment of FIG. 1 showing one surface in graduated inches and another surface not having a scale thereon.
Figure 4:
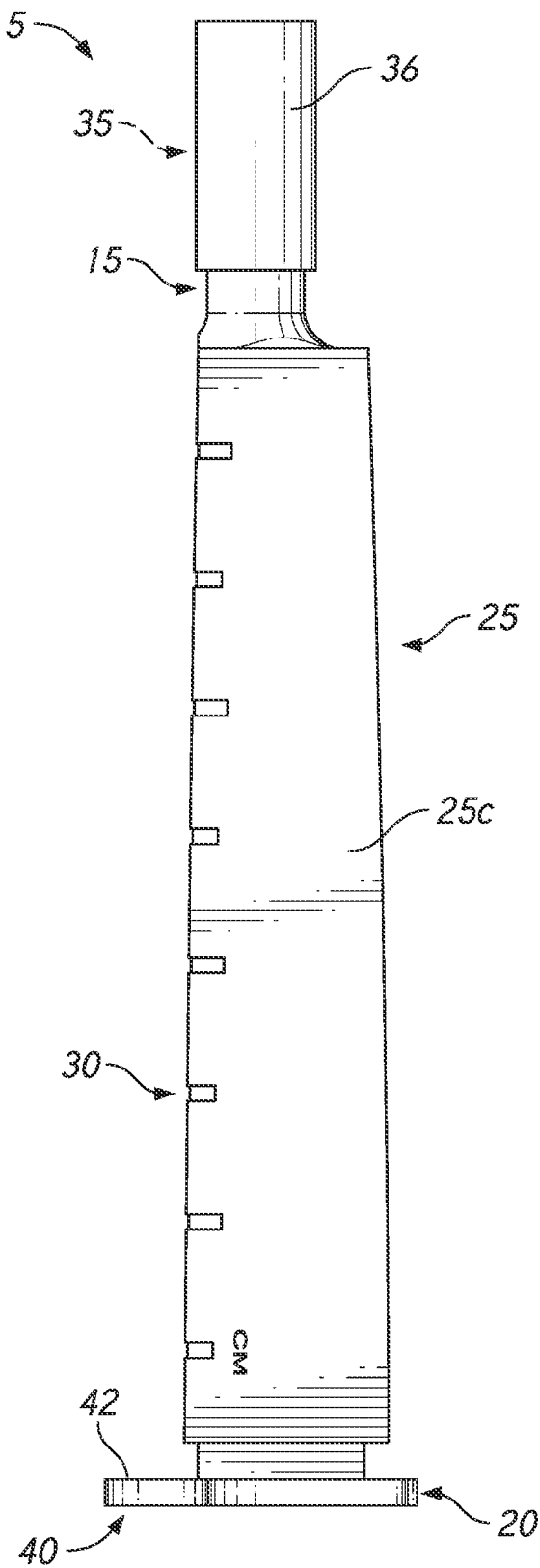
FIG. 4 is an elevation of the embodiment of FIG. 1 showing an opposite surface having a scale in graduated centimeters.

This invention relates generally to writing utensils bearing a scale for measuring articles. More specifically, the invention relates to writing utensils bearing a scale and having a reference guide for readily aligning the scale in relation to the article.

Referring initially to FIGS. 1, 7A, 8A and 9A, the marking utensil 5 comprises an elongated body 10 having opposite ends 15 and 20, with the body defining a plurality of outwardly-directed surfaces 25 (i.e., 25a, 25b, 25c and 25d) between the ends. A scale 30 is displayed on at least one surface 25 of the plurality, with at least one surface of the plurality configured for placement along an exteriority 26 of the article 27 to facilitate a measurement thereof. The scale may display U.S. Customary (i.e., inches) and/or Metric International System (i.e., centimeters) Units of measure. A marking tip 35 is located at one end 15 of the body 10 while the reference guide 40 is located at the body's other end 20. In the embodiments illustrated herein, the marking utensil 5 preferably comprises a felt-tipped marker having an internal ink reservoir in fluid communication with the felt tip, as understood in the art. However, it is understood that the marking utensil 5 may comprise ball-point-pens, pencils, crayons or any other marking utensil understood in the art as well.

The reference guide 40 of the utensil 5 is located at one end of the body 10, preferably opposite the end having the marking tip 35. As illustrated in the figures, the reference guide 40 is located at end 20 of the body 10, opposite the marking tip 35 located at end 15. However, it is understood that the guide 40 and tip 35 may be located at respective ends 15 and 20 as well. The guide 40 comprises an abutment surface 42 configured for placement along an edge 28 of the article 27 and is preferably about perpendicular to at least the surface 25 of the plurality configured for placement along the article's exteriority 26. However, it is understood that the abutment surface 42 may be displaced from at least that surface by any number of angular degrees as well.

The abutment surface 42 preferably defines a planar face configured for placement against the edge 28 of the article 27. To facilitate fast and efficient measurement, the reference guide 40 extends outwardly of at least the surface 25 configured for placement against the article's exteriority 26 such that the abutment surface 42 abuts the article's edge 28 when one of the surfaces 25 of the utensil's body is placed against the article's exteriority 26. The scale 30 originates at the abutment surface 40 such that the scale's graduated markings increase in value there-from. Thus, the abutment surface 42 of the reference guide 40 defines a zero-point 43 for the graduated scale 30.

Referring to FIGS. 1-4 and 6, the body 10 comprises three planar surfaces 25a, 25b and 25c defining a triangular cross-section. The scale 30, indicating graduated inches, is displayed on at least one surface (i.e., surface 25a) and originates at the zero point 43 of the reference guide 40. It is understood, however, that the scale 30 of surface 25a may indicate graduated centimeters as well. In the embodiment of FIGS. 1-4 and 6, each of the surfaces 25a, 25b and 25c is configured for placement along the exteriority 26 of the article 27, with the planar face defined by each surface configured for placement against a planar face or linear edge of the exteriority 26 of the article 27.

In a preferred embodiment of FIGS. 1-4 and 6, the marking utensil 5 displays at least two scales 30, each on a separate surface, with graduated inches defined on surface 25a and graduated centimeters defined on surface 25c. Both originate at the zero point 43 of the reference guide 40. It is noted that placement of the scales 30 on respective surfaces 25a and 25c preferably facilitates a simultaneous display of the inch and centimeter scales to a user of the marking utensil 5 when surface 25b is located against the exteriority 26 of article 27.

Figure 5:
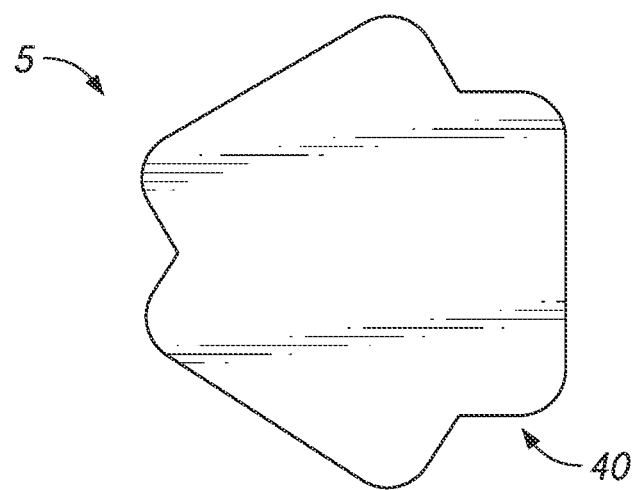
FIG. 5 is a plan view showing an underside of the reference guide of the embodiment of FIG. 1.
Figure 6:
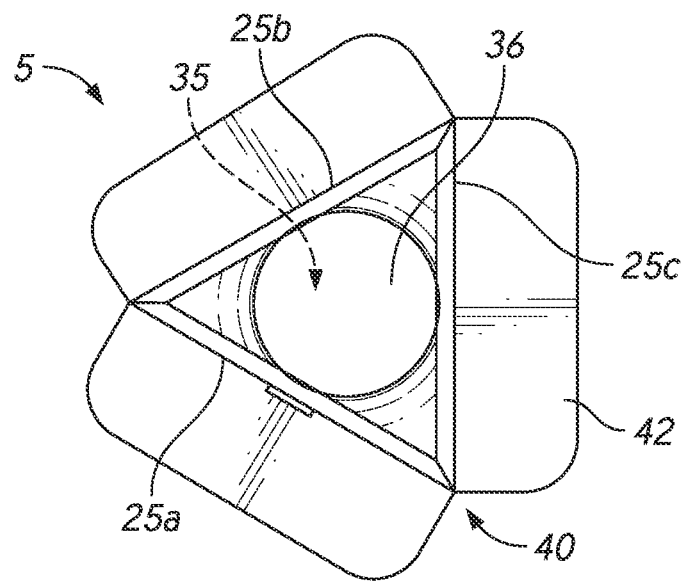
FIG. 6 is a plan view showing the upper side of the reference guide, the body and the capped marking tip of the embodiment of FIG. 1.

As illustrated in FIGS. 5 and 6, the reference guide 40 extends outwardly of the three surfaces 25a, 25b, and 25c body 10 such that the abutment surface 42 abuts the article's edge 28 when one of the surfaces 25 of the utensil's body is placed against the article's exteriority 26.

Figure 7A:
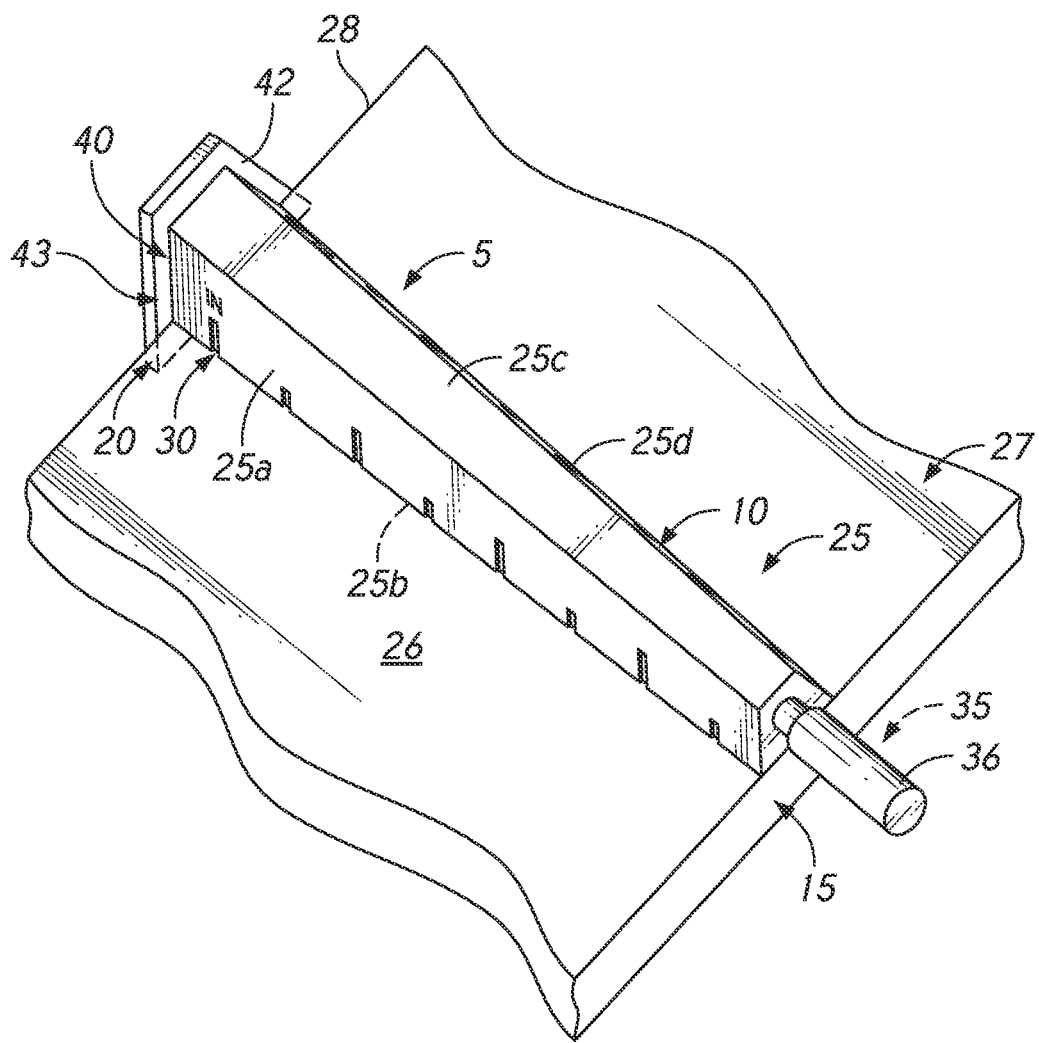
FIG. 7A is a perspective view of a further embodiment of the writing utensil having a body defining the cross section of a trapezoid showing one surface having a scale in graduated inches and another surface having a scale in graduated centimeters.
Figure 7B:
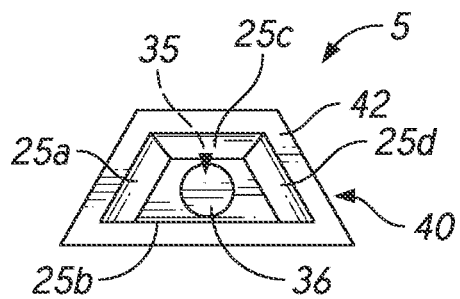
FIG. 7B is a plan view showing the upper side of the reference guide, the body and the capped marking tip of the embodiment of FIG. 7A.

Referring to FIGS. 7A and 7B, the body 10 comprises four planar surfaces 25a, 25b, 25c and 25d defining a trapezoidal cross-section. The scale 30, indicating graduated inches, is displayed on at least one surface (i.e., surface 25a) of the four surfaces and originates at the zero point 43 of the reference guide 40. It is understood, however, that the scale 30 of surface 25a may indicate graduated centimeters as well. In the embodiment of FIGS. 7A and 7B, each of the surfaces 25a, 25b, 25c and 25d is configured for placement along the exteriority 26 of the article 27, with the planar face defined by each surface configured for placement against a planar face or linear edge of the exteriority 26 of the article 27.

In a preferred embodiment of FIGS. 7A and 7B, the marking utensil 5 displays at least two scales 30, each on a separate surface, with graduated inches defined on surface 25a and graduated centimeters defined on surface 25c. Both originate at the zero point 43 of the reference guide 40. The chosen surfaces of the trapezoidal cross-section are not parallel to one another such that that the placement of the scales 30 on respective surfaces 25a and 25c preferably facilitates a simultaneous display of the inch and centimeter scales to a user of the marking utensil 5 when surface 25b is located against the exteriority 26 of article 27.

As illustrated in FIG. 7B, the reference guide 40 extends outwardly of the four surfaces 25a, 25b, 25c and 25d of the body 10 such that the abutment surface 42 abuts the article's edge 28 when one of the surfaces 25 of the utensil's body is placed against the article's exteriority 26.

Figure 8A:
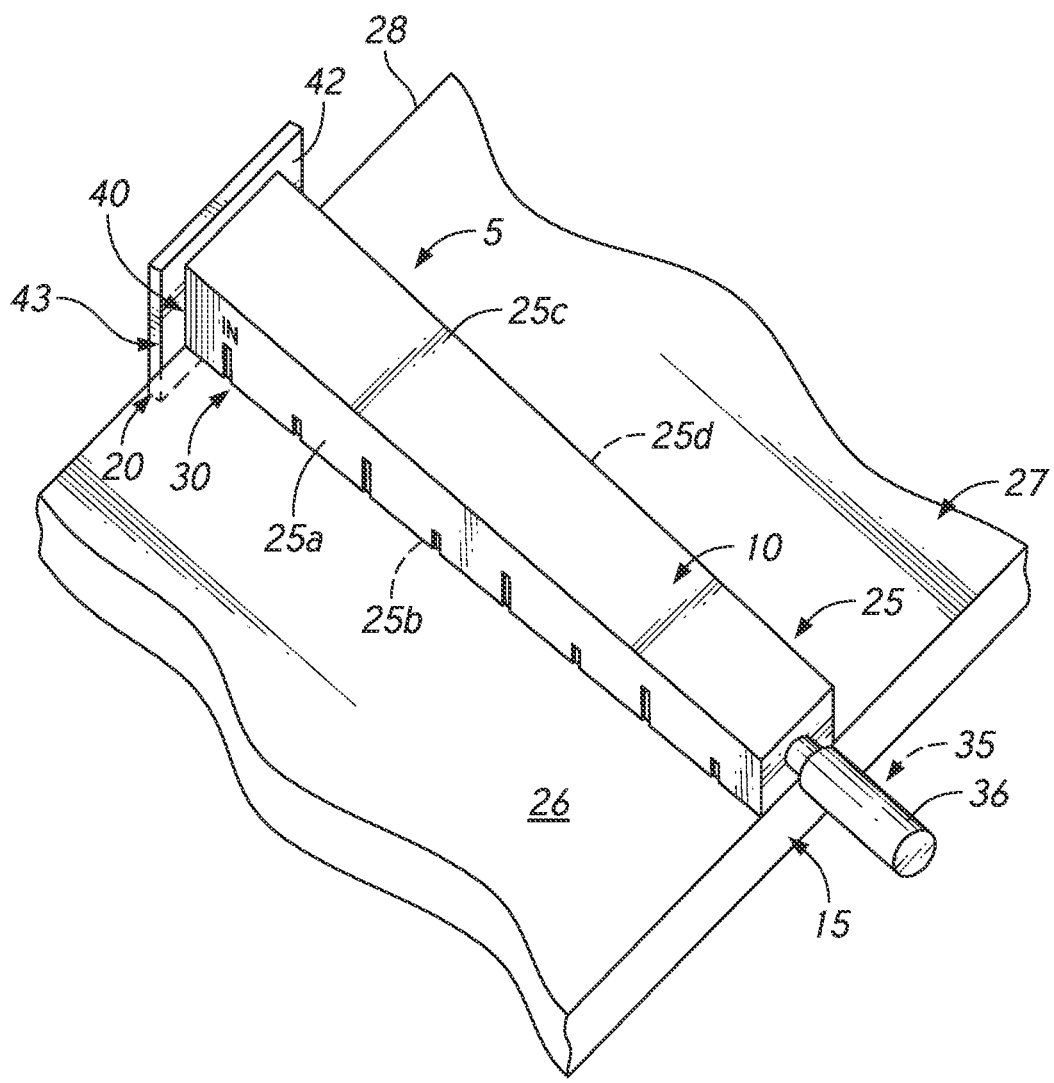
FIG. 8A is a perspective view of a further embodiment of the writing utensil a body defining a cross-section with 90 degree angles and showing one surface having a scale in graduated inches and another surface having a scale in graduated centimeters.
Figure 8B:
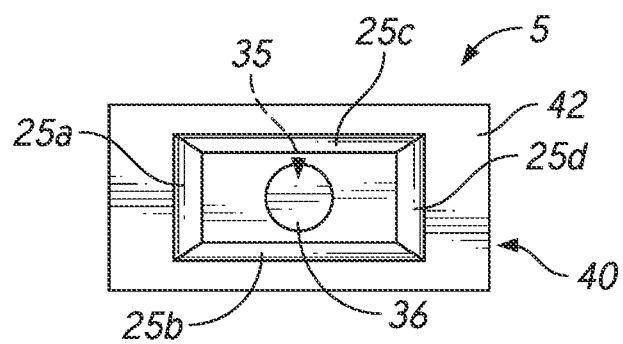
FIG. 8B is a plan view showing the upper side of the reference guide, the body and the capped marking tip of the embodiment of FIG. 8A.

Referring to FIGS. 8A and 8B, the body 10 comprises four planar surfaces 25a, 25b, 25c and 25d defining a cross-section having 90 degree corners. Although the figures illustrate a rectangular cross-section, it is understood that the cross-section may be square as well. The scale 30, indicating graduated inches, is displayed on at least one surface (i.e., surface 25a) of the four surfaces and originates at the zero point 43 of the reference guide 40. It is understood, however, that the scale 30 of surface 25a may indicate graduated centimeters as well. In the embodiment of FIGS. 8A and 8B, each of the surfaces 25a, 25b, 25c and 25d is configured for placement along the exteriority 26 of the article 27, with the planar face defined by each surface configured for placement against a planar face or linear edge of the exteriority 26 of the article 27.

In a preferred embodiment of FIGS. 8A and 8B, the marking utensil 5 displays at least two scales 30, each on a separate surface, with graduated inches defined on surface 25a and graduated centimeters defined on surface 25c. Both originate at the zero point 43 of the reference guide 40. The chosen surfaces of the cross-section having 90 degree corners are parallel to one another such that that the placement of the scales 30 on respective surfaces 25a and 25c preferably facilitates a display of both the inch and centimeter scales to a user of the marking utensil 5 when surface 25b is located against the exteriority 26 of article 27.

As illustrated in FIG. 8B, the reference guide 40 extends outwardly of the four surfaces 25a, 25b, 25c and 25d of the body 10 such that the abutment surface 42 abuts the article's edge 28 when one of the surfaces 25 of the utensil's body is placed against the article's exteriority 26.

Figure 9A:
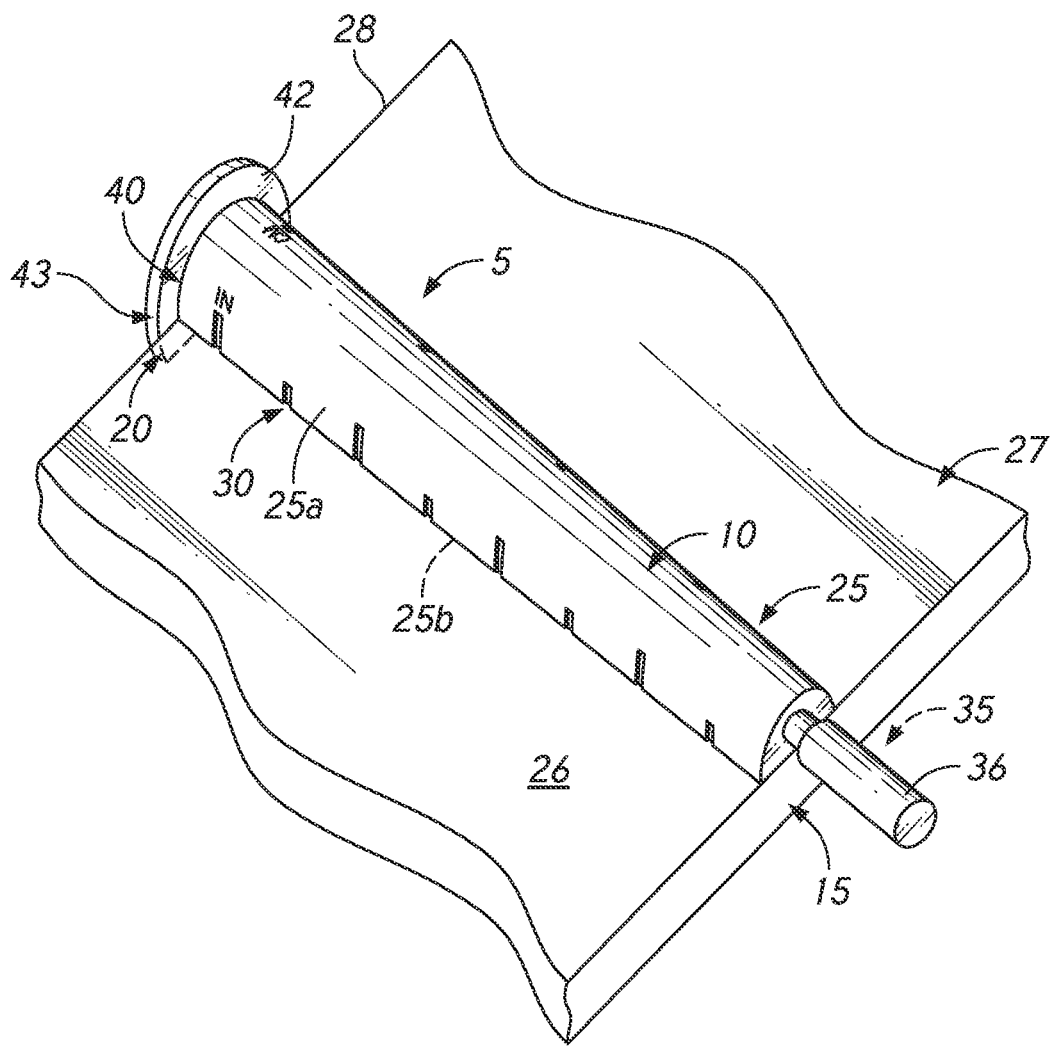
FIG. 9A is a perspective view of a further embodiment of the writing utensil having a body wherein one surface is arcuate and another surface is planar, the arcuate surface having scales in both graduated inches and graduated centimeters thereon.
Figure 9B:
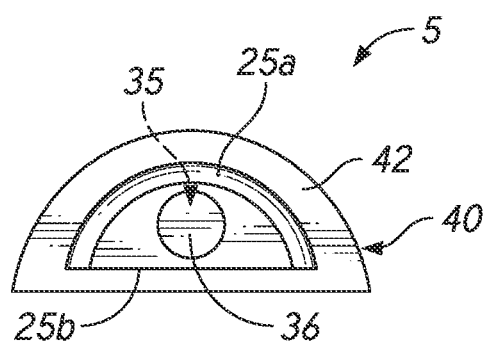
FIG. 9B is a plan view showing the upper side of the reference guide, the body and the capped marking tip of the embodiment of FIG. 9A.

Referring to FIGS. 9A and 9B, the body 10 comprises an arcuate surface 25a and a planar surface 25b, with the scale 30 displayed on at least the arcuate surface 25a and indicating graduated inches originating at the zero point 43 of the reference guide 40. It is understood, however, that the scale 30 of surface 25a may indicate graduated centimeters as well. In the preferred embodiment of FIGS. 9A and 9B, the arcuate surface 25a is configured for placement along the exteriority 26 of the article 27 while the planar face defined by surface 25b is configured for placement against a planar face or linear edge of the exteriority 26 of the article 27.

In the preferred embodiment of FIGS. 9A and 9B, the arcuate embodiment of the marking utensil 5 displays at least two scales 30 on arcuate surface 25a, one indicating graduated inches and the other indicating graduated centimeters. Both originate at the zero point 43 of the reference guide 40. The scales are located in opposing relation to one another along the arcuate surface 25a, each originating at the zero point, to facilitate facilitates a display of both the inch and centimeter scales to a user of the marking utensil 5 when surface 25b is located against the exteriority 26 of article 27.

As illustrated in FIG. 9B, the reference guide 40 extends outwardly of the arcuate and planar surfaces 25a and 25b of the body 10 such that the abutment surface 42 abuts the article's edge 28 when one of the surfaces 25 of the utensil's body is placed against the article's exteriority 26.

In use, the body of a marking utensil bearing a scale is placed against an exteriority of the article, the body having opposite ends, defining a plurality of outwardly-directed surfaces between the ends and displaying a scale on at least one surface of the plurality. An abutment surface of the reference guide of the body is located against an edge of the article, the abutment surface defining a zero point for the scale. The location of graduated marking of the scale is thereafter read in relation to a desired portion of the article to be measured.

While this foregoing description and accompanying figures are illustrative of the present invention, other variations in structure and method are possible without departing from the invention's spirit and scope.

I claim:

1. A marking utensil for measuring an article comprising:
   an elongated body having opposite ends, the body defining a plurality of outwardly directed surfaces between the ends, each outwardly directed surface gradually increasing in width along a length of that surface from a first width defined by that surface at one end of the body to a second width defined by that surface at the other end of the body, at least one outwardly directed surface configured for placement against an exteriority of the article and defining a plane;
   a pair of scales displayed on the elongated body;
   a marking tip located at said one end of the body; and
   a reference guide located at said other end of the body, the guide having an abutment surface configured for placement against an edge of the article and defining a zero point for each of the pair of scales.

2. The marking utensil of claim 1 wherein the body comprises three planar surfaces defining a triangular cross-section, one scale of the pair displayed on one of the three surfaces and indicating graduated inches, the other scale of the pair displayed on another of the three surfaces and indicating graduated centimeters.

3. A marking utensil for measuring an article comprising:
   an elongated body having opposite ends, the body defining a plurality of outwardly directed surfaces between the ends, at least one outwardly directed surface configured for placement against an exteriority of the article and defining a plane;
   a pair of scales displayed on the elongated body;
   a marking tip located at one end of the body;
   a reference guide located at the other end of the body, the guide having an abutment surface configured for placement against an edge of the article and defining a zero point for each of the pair of scales, the body comprising four planar surfaces defining a trapezoidal cross section having no 90 degree corners, one scale of the pair displayed on one of the four surfaces and indicating graduated inches, the other scale of the pair displayed on another of the four surfaces and indicating graduated centimeters, the surfaces displaying the scales not having a parallel relation to one another.

4. The marking utensil of claim 1 wherein the body comprises four planar surfaces defining a cross-section having 90 degree corners, one scale of the pair displayed on one of the four surfaces and indicating graduated inches, the other scale of the pair displayed on another of the four surfaces and indicating graduated centimeters, the surfaces displaying the scales located in opposing relation to one another.

5. The marking utensil of claim 1 wherein body comprises a planar surface and an arcuate surface, one scale of the pair displayed on the arcuate surface and indicating graduated inches originating at the zero point, the other scale of the pair displayed on the arcuate surface and indicating graduated centimeters originating at the zero point, said other scale located in opposing relation to said one scale about the arcuate surface.

6. A method of measuring an article with a writing utensil comprising:
   placing an elongated body of the utensil against the article, the body having opposite ends and defining a plurality of outwardly-directed surfaces between the ends and displaying a pair of scales, each outwardly directed surface gradually increasing in width along a length of that surface from a first width defined by that surface at one end of the body to a second width defined by that surface at the other end of the body;
   locating an abutment surface of a reference guide of the body against an edge of the article, the abutment surface guide defining a zero point for each of the pair of scales; and
   reading the location of at least one graduated marking of the scale in relation to a desired portion of the article.

* * * * *